United States Patent
Al-Mutairi

[19]

[11] Patent Number: 6,115,950
[45] Date of Patent: Sep. 12, 2000

[54] ROTATING DISPLAY

[76] Inventor: Saud Shanar Al-Mutairi, Block #5, St.#57, House #10, Shamiah, Kuwait

[21] Appl. No.: 09/307,432

[22] Filed: May 10, 1999

[51] Int. Cl.[7] .................................................. G09F 19/00
[52] U.S. Cl. ............................ 40/406; 40/412; 40/414; 40/430; 472/134
[58] Field of Search .......................... 40/406, 411, 412, 40/414, 430, 440; 446/159, 180, 186; 472/134; 60/495, 496; 74/DIG. 9

[56] References Cited

U.S. PATENT DOCUMENTS

| | | | |
|---|---|---|---|
| 2,135,606 | 11/1938 | Stuve | 40/411 X |
| 2,280,684 | 4/1942 | Bronner, Sr. | 40/431 |
| 2,532,572 | 12/1950 | Reeves | 40/411 X |
| 3,194,008 | 7/1965 | Baumgartner | 74/DIG. 9 X |
| 3,939,356 | 2/1976 | Loane | 290/52 |
| 4,084,375 | 4/1978 | Horvath | 60/496 |
| 4,196,590 | 4/1980 | Fries | 60/496 |
| 4,363,212 | 12/1982 | Everett | 60/496 |
| 4,407,130 | 10/1983 | Jackson | 60/496 |
| 4,471,613 | 9/1984 | Lang | 60/496 |
| 4,718,232 | 1/1988 | Willmouth | 60/495 |
| 5,104,346 | 4/1992 | Smrt | 40/412 X |
| 5,430,333 | 7/1995 | Binford et al. | 290/54 |
| 5,944,480 | 8/1999 | Forrest | 415/5 |

*Primary Examiner*—Brian K. Green
*Attorney, Agent, or Firm*—Richard L. Miller, P.E

[57] ABSTRACT

A rotating display that includes a fixed frame, a rotating frame that is rotatably mounted to the fixed frame, and apparatus that rotatably moves the rotating frame relative to the fixed frame. The apparatus includes a pool that contains water, eight movable arms that receive associated ends of associated fixed arms and move radially along the associated fixed arms, four joining bars that fixedly join and extend radially along aligned associated pairs of moveable arms, eight weights that are affixed on associated ends of associated joining bars, eight air pumps that have housings that are fixedly attached to associated bars and contain bellows, eight tubes that extend from inner terminal ends radially outwardly from the housings of associated air pumps to outer terminal ends, with the inner terminal ends thereof being in fluid communication with the bellows of the associated air pumps, and eight balls that are in fluid communication with the outer terminal ends of associated tubes.

6 Claims, 3 Drawing Sheets

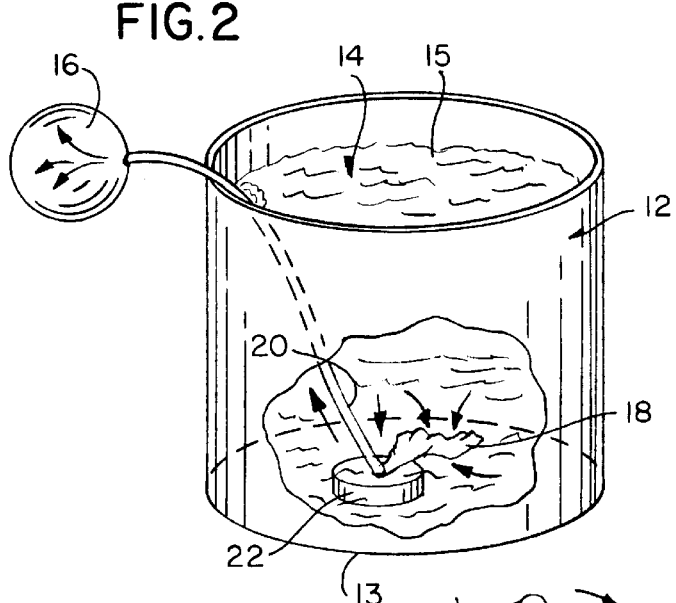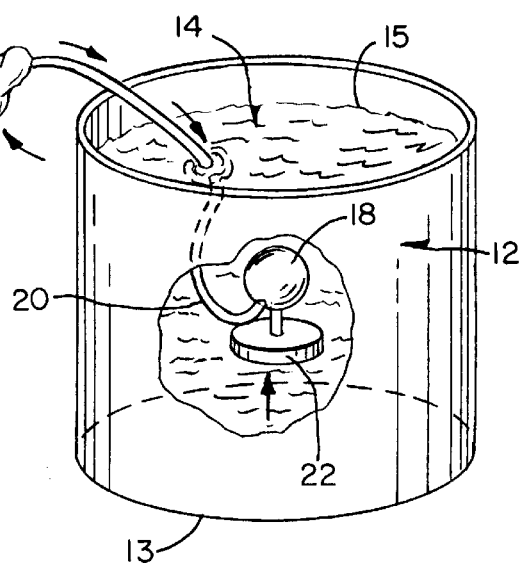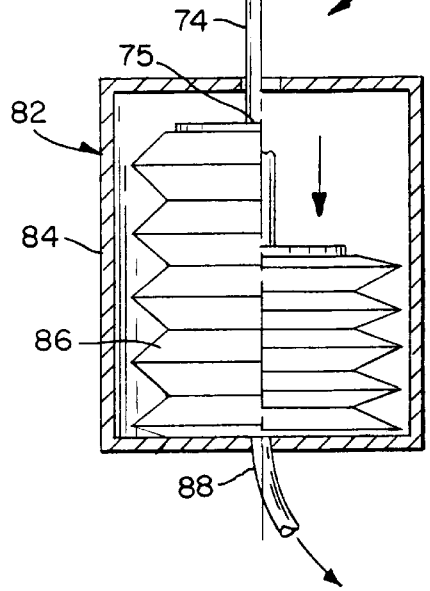

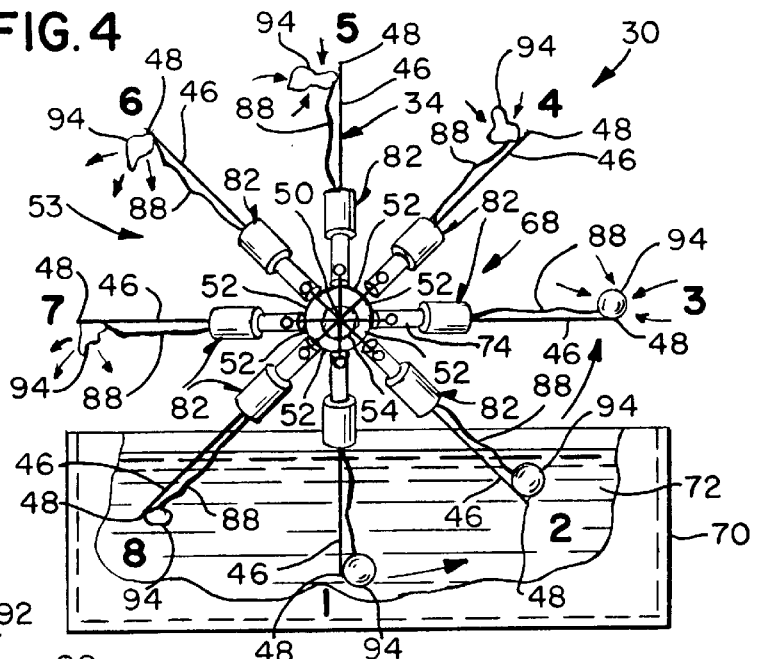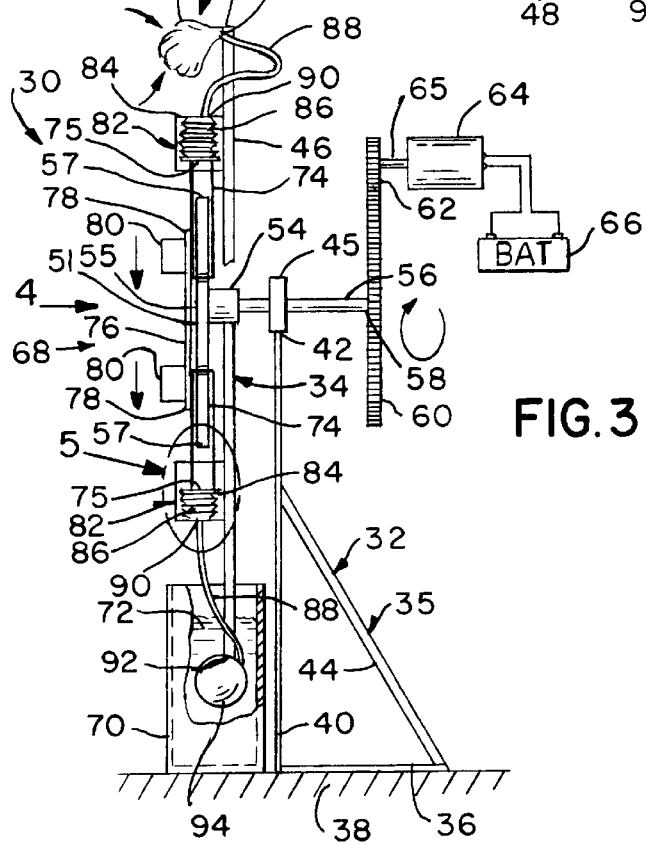

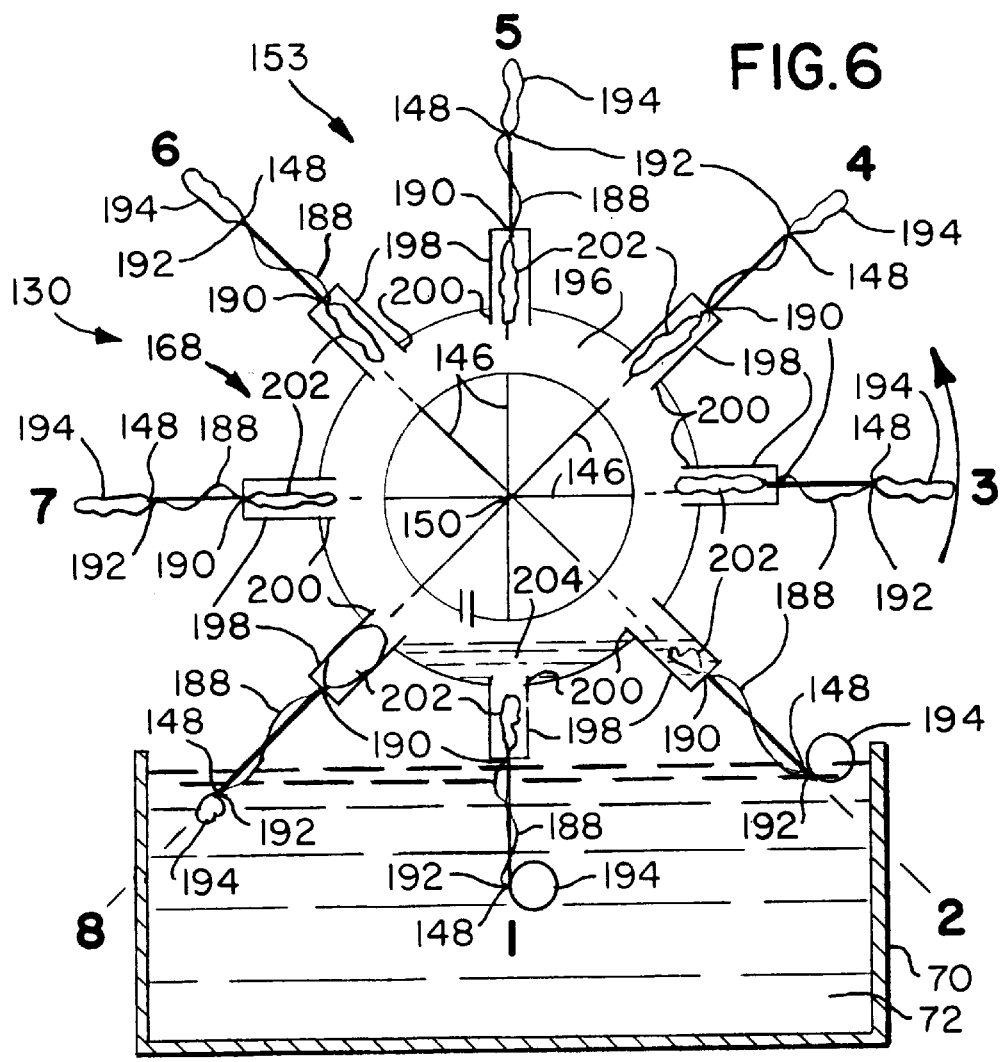

ROTATING DISPLAY

BACKGROUND OF THE INVENTION

1. Field of the Invention

The present invention relates to a display. More particularly, the present invention relates to a rotating display.

2. Description of the Prior Art

Numerous innovations for rotating devices have been provided in the prior art that will be described infra. Even though these innovations may be suitable for the specific individual purposes to which they address, however, they differ from the present invention.

A FIRST EXAMPLE, U.S. Pat. No. 3,939,356 to Loane teaches a hydro-air storage system for generating electricity in which a subterranean reservoir containing water is pressurized and the water is pumped to a surface reservoir during periods when the demand for electricity is low and in which water from the surface reservoir flowing into the subterranean reservoir and compressed air released from the subterranean reservoir are both utilized to generate electricity during periods when the demand for electricity is high.

A SECOND EXAMPLE, U.S. Pat. No. 4,084,375 to Horvath teaches a method and apparatus for generating buoyancy power comprising harnessing the buoyant energy contained in hydrogen and oxygen gases which are electrolytically generated under water. A first wheel is submerged in water with a second wheel submerged vertically beneath the first wheel. An endless belt engages and is stretched between the outer surfaces of the first and second wheels and is adapted to rotate the wheels when the belt is driven. A power generator is coupled to one of the wheels and is drivable therewith. As the hydrogen and oxygen gas bubbles are generated at the respective submerged electrodes of an electrolytic generators the rising bubbles are separately caught in two columns of receptacles along one side of the belt thereby displacing the water from the receptacles and rendering them buoyant. The buoyant receptacles then drive the belt and the first and second wheels thereby causing the power generator to produce an electric current. The hydrogen and oxygen gases are then separately collected in submerged hoods as they are released from the respective columns of buoyant receptacles as the belt and receptacles move over the first wheel. Also provided are two funnels for channelling the hydrogen and oxygen gas bubbles from the submerged electrodes to the respective columns of receptacles.

THIRD EXAMPLE, U.S. Pat. No. 4,407,130 to Jackson teaches a drive utilizing at least two units of which one may be an auxiliary. Each unit is positionable in a relatively deep body of water and has upper and lower sprockets about which a chain is trained which carries a series of receptacles that open in the trailing direction. The chain courses of the conveyors that are to travel upwardly are close together and air under pressure is delivered into the receptacles of at least one unit as they reach the lower end of its upwardly travelling course to render the receptacles of those courses buoyant. At least one receptacle of each unit is positioned to receive air escaping from or bypassing a receptacle of the other unit. At the upper end of the downwardly travelling courses, the receptacles become weighed as they fill with water.

A FOURTH EXAMPLE, U.S. Pat. No. 5,430,333 to Binford et al. teaches a plurality of inflation devices that are linked to one another to form a loop that is movably restrained so that a segment of the loop is disposed at a lower reference location at the given depth in a first body of water, another segment of the loop is disposed at an upper reference location situated above the lower reference located, another segment of the loop extends along a first path that extends generally upward from the lower reference location to the upper reference location, and another segment of the loop extends along a second path that extends generally parallel to the first path and upward from the lower reference location to the upper reference location. At least a majority of the inflation devices occupying the first path are inflated with gas and at least a majority of the inflation devices occupying the second path are deflated so that inflation devices in the first path move upward and inflation devices in the second path move downward. While each inflation device is proximate to the upper reference location, it is deflated by a compression facility that employs a differential temperature to controllably "stroke" Nitinol. The traveling or movement of the inflation devices is utilized to elevate water that flows, under the force of gravity, through a hydroelectric generating facility that generates electricity.

It is apparent that numerous innovations for prime movers have been provided in the prior art that are adapted to be used. Furthermore, even though these innovations may be suitable for the specific individual purposes to which they address, however, lo they would not be suitable for the purposes of the present invention as heretofore described.

SUMMARY OF THE INVENTION

ACCORDINGLY, AN OBJECT of the present invention is to provide a rotating display that avoids the disadvantages of the prior art.

ANOTHER OBJECT of the present invention is to provide a rotating display that is simple and inexpensive to manufacture.

STILL ANOTHER OBJECT of the present invention is to provide a rotating display that is simple to use.

BRIEFLY STATED, YET ANOTHER OBJECT of the present invention is to provide a rotating display that includes a fixed frame, a rotating frame that is rotatably mounted to the fixed frame, and apparatus that rotatably moves the rotating frame relative to the fixed frame. The apparatus includes a pool that contains water, eight movable arms that receive associated ends of associated fixed arms and move radially along the associated fixed arms, four joining bars that fixedly join and extend radially along aligned associated pairs of moveable arms, eight weights that are affixed on associated ends of associated joining bars, eight air pumps that have housings that are fixedly attached to associated bars and contain bellows, eight tubes that extend form inner terminal ends radially outwardly from the housings of associated air pumps to outer terminal ends, with the inner terminal ends thereof being in fluid communication with the bellows of the associated air pumps, and eight balls that are in fluid communication with the outer terminal ends of associated tubes.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

The principle in which the present invention operates can best be seen in FIGS. 1 and 2, and as such, will be discussed with reference thereto.

A pool 12 with a bottom 13 is filled with water 14 with a surface 15. A first ball 16 is fluidly connected to a second ball 18, by a plastic tube 20. A weight 22 is attached to the second ball 18. The second ball 18 is placed in the pool 12 and the first ball 16 is placed outside the pool 12. As a result of the weight 22, the second ball 18 sinks to the bottom 13 of the pool 12. The first ball 16 is inflated. Pressure is applied to the first ball 16 causing the air in the first ball 16 to leave the first ball 16 and travel through the plastic tube 20 into and inflate the second ball 18 causing the second ball 18 to rise to the surface 15 of the water 14. Pressure is then applied to the second ball 18 causing the air in the second ball 18 to leave the second ball 18 and travel through the plastic tube 20 into and inflate the first ball 16 and deflate the second ball 18 causing the second ball 18 to sink to the bottom 13 of the pool 12, and so on back and forth.

DESCRIPTION OF THE DRAWING

The figures of the drawing are briefly described as follows:

FIG. 1 is a diagrammatic perspective view illustrating one phase of the principle in which the present invention operates;

FIG. 2 is a diagrammatic perspective view illustrating another phase of the principle in which the present invention operates;

FIG. 3 is a diagrammatic side elevational view of a first embodiment of the present invention;

FIG. 4 is a diagrammatic front elevational view taken generally in the direction of arrow 4 in FIG. 3;

FIG. 5 is an enlarged diagrammatic cross sectional view of the area generally enclosed by the dotted curve identified by arrow 5 in FIG. 3 of an air pump of the present invention; and FIG. 6 is a diagrammatic front elevational view of a second embodiment of the present invention.

LIST OF REFERENCE NUMERALS UTILIZED IN THE DRAWING

Principle 12 pool
13 bottom of pool 12
14 water
15 surface of water 14
16 first ball
18 second ball
20 plastic tube
22 weight

First Embodiment 30 rotating display
32 fixed frame
35 stand of fixed frame 32
36 base plate of stand 35 of fixed frame 32 for resting on horizontal surface 38
38 horizontal surface
40 upright member of stand 35 of fixed frame 32
42 upper terminal end of upright member 40 of stand 35 of fixed frame 32
44 pair of brace members of stand 35 of fixed frame 32
45 bearing of stand 35 of fixed frame 32
46 four bars of rotating frame 34
48 pair of ends of each bar of four bars 46 of rotating frame 34
50 midpoint of each bar of four bars 46 of rotating frame 34
51 four fixed arms of rotating frame 34
52 equal angles separating four bars 46 of rotating frame 34 from each other
53 wheel formed by four bars 46 of rotating frame 34
54 sleeved hub of rotating frame 34
55 midpoint of each fixed arm 31 of four fixed arms 51 of rotating frame 34
56 shaft of rotating frame 34
57 pair of ends of each fixed arm 51 of four fixed arms 51 of rotating frame 34
58 terminal end of shaft 56 of rotating frame 34
60 flywheel of rotating frame 34
62 gear of rotating frame 34
64 generator of rotating frame 34
65 armature of generator 64 of rotating frame 34
66 rechargeable battery of rotating frame 34
68 apparatus
70 pool of apparatus 68
72 water contained in pool 70 of apparatus 68
74 eight movable arms of apparatus 68
76 four joining bars of apparatus 68
78 pair of ends of each joining bar of four joining bars 76 of apparatus 68
80 eight weights of apparatus 68
82 eight air pumps of apparatus 68
84 housing of each air pump of eight air pumps 82 of apparatus 68
86 bellows contained in housing 84 of each air pump of eight air pumps 82 of apparatus 68
88 eight tubes of apparatus 68
90 inner terminal end of each tube of eight tubes 88 of apparatus 68
92 outer terminal end of each tube of eight tubes 88 of apparatus 68
94 eight balls of apparatus 68

Second Embodiment 130 rotating display of the present invention
146 four bars
148 pairs of ends of four bars 146
150 midpoints of four bars 146
153 wheel
168 apparatus
188 eight tubes of apparatus 168
190 inner terminal end of each tube of eight tubes 188 of apparatus 168
192 outer terminal end of each tube of eight tubes 188 of apparatus 168
194 eight outer balls of apparatus 168
196 ring of apparatus 168
198 eight cylinders of apparatus 168
200 rim of each cylinder of eight cylinders 198 of apparatus 168
202 eight inner balls of apparatus 168
204 liquid of apparatus 168

DETAILED DESCRIPTION OF THE PREFERRED EMBODIMENT

Referring now to the figures, in which like numerals indicate like parts, and particularly to FIGS. 3–5, the first embodiment of the rotating display of the present invention is shown generally at 30.

The rotating display 30 comprises a fixed frame 32 and a rotating frame 34 rotatably mounted to the fixed frame 32.

The fixed frame 32 comprises a stand 35 that comprises a base plate 36 that is horizontally-oriented for resting on a horizontal surface 38.

The stand 35 further comprises an upright member 40 that extends vertically upwardly from the base plate 36, to an upper terminal end 42.

The stand 35 further comprises a pair of brace members 44 that depend incliningly from the upright member 40 to the base plate 36 and maintain the upright member 40 upright.

The stand 35 further comprises a bearing 45 that extends upwardly, in a vertical plane, from the upper terminal end 42 of the upright member 40 or the fixed frame 32.

The rotating frame 34 comprises four bars 46 that are slender, elongated, and rotate in a vertical plane. Each bar 46 has a pair of ends 48 and a midpoint 50 that is midway between the pair of ends 48 thereof.

The four bars 46 are joined to each other at their midpoints 50, and extend radially outwardly therefrom, and are separated from each other by equal angles 52 to form a wheel 53.

The rotating frame 34 further comprises a sleeved hub 54 that extends horizontally through and is affixed to the midpoint 50 of each bar 46 for rotation therewith.

The rotating frame 34 further comprises four fixed arms 51 that are slender, elongate, and rotate in a vertical plane. Each fixed arm 51 has a pair of ends 57 and a midpoint 55 which is midway between the pair of ends 57 thereof.

The four fixed arms 51 are jointed to each other, at their midpoints 55, which are joined to the sleeved hub 54 for rotation therewith, and extend radially outwardly therefrom.

The four fixed arms 51 are spaced forwardly from, and overlie, but are shorter than, an associated bar 46.

The rotating frame 34 further comprises a shaft 56 that extends horizontally from and is affixed to the sleeved hub for rotation therewith, and passes rotatably through the bearing 45 of the stand 35 for rotation relative thereto, to a terminal end 58.

The rotating frame 34 further comprises a flywheel 60 that is vertically-oriented and affixed to the terminal end 58 of the shaft 56 for rotation therewith.

The rotating frame 34 further comprises a gear 62 that is vertically-oriented, and smaller than and engages with the flywheel 60 for rotation therewith.

The rotating frame 34 further comprises a generator 64 that has an armature 65 that is operatively connected to the gear 62 for rotation therewith.

The rotating frame 34 further comprises a rechargeable battery 66 that is in electrical communication with the generator 64, and is charged by the generator when the wheel 53 rotates, which causes the shaft 56 to rotate, which causes the flywheel 60 to rotate, which causes the gear 62 to rotate, which causes the armature 65 of the generator to rotate, which causes the generator 64 to generate electricity, which charges the rechargeable battery 66.

The rotating display 30 further comprises apparatus 68 rotating the wheel 53 relative to the stand 35.

The apparatus 68 comprises a pool 70 that contains water 72, and which is so positioned so as to allow the pair of ends 48 of each of the four bars 46 to pass through the water 72.

The apparatus 68 further comprises eight movable arms 74. Each moveable arm 74 movably receives an associated end 57 of an associated fixed arm 51 and moves radially along the associated fixed arm 51 for movement relative thereto, to an outer terminal end 75.

The apparatus 68 further comprises four joining bars 76. Each joining bar 76 has ends 78 that fixedly join and extend radially along aligned associated pairs of moveable arms 74 for movement therewith.

The apparatus 68 further comprises eight weights 80. Each weight 80 is affixed on an associated end 78 of an associated joining bar 76 for movement therewith and has a radial component and a tangential component.

The apparatus 68 further comprises eight air pumps 82. Each air pump 82 has a housing 84 that is fixedly attached to an associated bar 46 for rotation therewith.

The housing 84 of each air pump 82 contains a bellows 86 that is movably mounted therein, and which is fixedly connected to the outer terminal end 75 of an associated movable arm 74 for radial movement therewith.

The apparatus 68 further comprises eight tubes 88 that are plastic. Each tube 88 extends form an inner terminal end 90 radially outwardly from the housing 84 of an associated air pump 82 to an outer terminal end 92, with the inner terminal end 90 thereon being in fluid communication with the bellows 86 of the associated air pump 82.

The apparatus 68 further comprises eight balls 94 that are inflatable. Each ball 94 is fixedly attached to an associated end 48 of an associated bar 46 for rotation therewith and is in fluid communication with the outer terminal end 92 of an associated tube 88.

In an effort to facilitate understanding of the operation of the rotating display 30, the static position of each end 48 of each arm 46 will be consecutively numbered counterclockwise from 1–8, with 1 being the position of the end 48 that is lowest in the water 72.

The weights 80 at positions 1 and 5 are all in their radial components with no tangential components as a result of their vertical orientation. This causes the weights 80 at positions 1 and 5 to drop vertically down, which causes associated movable arms 74 to drop slidingly down along associated fixed arms 51. This causes the bellows 86 at position 1 to fully compress and the bellows 86 at position 5 to fully decompress. This causes the ball 94 at position 1 to completely inflate and the ball 94 at position 5 to completely deflate. This causes the ball 94 at position 1 to rise to the surface of the water 72 to position 2 as a result of its buoyancy, which causes the wheel 53 to turn counterclockwise.

As the wheel 53 continues to turn counterclockwise, the radial component of the weight 80 at position 3 decreases. This reduces compression on the bellows 36 at position 3, until the weight 80 reaches position 4 at which time the weight 80 at position 4 moves away from the bellows 86 at position 4 deflating the ball 94 at position 4. The ball 94 remains completely deflated through positions 5–7. The weight 80 at position 8 begins to inflate the ball 94 at position 8 simultaneously with the ball 94 at position 4 being deflated, by virtue of the weight 80 at position 8 dropping down an associated movable arm 74 along an associated fixed arm 51. The inflating ball 94 at position 8 continues to turn the wheel 53 counterclockwise as a result of its buoyancy until position 1 is again reached and the cycle repeats itself.

The configuration of a second embodiment of the rotating display 130 can best be seen in FIG. 6, and as such, will be discussed with reference thereto.

The apparatus 168 comprises a ring 196 that lies in a vertical plane, is hollow, and extends circumferentially around the four bars 146, between their midpoints 150 and their pairs of ends 148, and is vented.

The apparatus 168 further comprises eight cylinders 198 that are hollow. Each cylinder 198 extends radially outwardly from a rim 200 thereof that is partially in the ring 196 and is in fluid communication therewith, radially outwardly therefrom along an associated bar 146.

The apparatus 168 further comprises eight inner balls 202 that are inflatable. Each inner ball 202 is disposed in an associated cylinder 198 for movement therein.

The apparatus 168 further comprises eight tubes 188 that are plastic. Each tube 188 extends form an inner terminal end 190 radially outwardly from an associated cylinder 198 to an outer terminal end 192, with the inner terminal end 190 thereof being in fluid communication with an associated inner ball 202.

The apparatus 168 further comprises eight outer balls 194 that are inflatable. Each outer ball 194 is fixedly attached to an associated end 148 of an associated bar 146 for rotation therewith, and is in fluid communication with the outer terminal end 192 of an associated tube 188.

The apparatus 168 further comprises a liquid 204 that is contained in the ring 196, to a specific level.

The liquid 204 is heavier than water and is mercury.

In an effort to facilitate understanding of the operation of the rotating display 130 the static position of each end 148 of each arm 146 will be consecutively numbered counter-clockwise from 1–8, with 1 being the position of the end 148 that is lowest in the water 72.

At position 1, the liquid 204 in the ring 196 fills the cylinder 198 at position 1 and the ring 196 to a level of just short of the rims 200 of the cylinders 196 at positions 8 and 2. The weight of the liquid 204 exerts a pressure on the inner ball 202 at position 1. This causes the inner ball 202 at position 1 to completely deflate and completely inflate the outer ball 194 at position 1 by virtue of the liquid 204 being heavier than the water 72 in the pool 70. This causes the ball 94 at position 1 to rise to the surface of the water 72 to position 2 as a result of its buoyancy, which causes the wheel 153 to turn counterclockwise.

As the wheel 153 continues to turn counterclockwise, some of the liquid 204 remains in the cylinder 198 at position 2. This causes the outer ball 194 at position 2 to remain inflated, until it reaches position 3 where it is completely void of the liquid 204. This causes the outer ball 194 at position 3 to partially deflate which causes the outer ball 194 at position 3 and the inner ball 202 at position to remain in equilibrium. The outer ball 194 and the inner ball 202 remain in equilibrium through positions 4–7. The outer ball 194 at position 8 is subjected to the pressure of the water 72 which compresses the outer ball 194 at position 8 completely and inflates the inner ball 202 at position 8 completely, by virtue of the rim 200 of the cylinder 202 at position 8 preventing the liquid 204 from entering the cylinder 202 at position 8, until position 1 is again reached and the cycle repeats itself.

It will be understood that each of the elements described above, or two or more together, may also find a useful application in other types of constructions differing from the types described above.

While the invention has been illustrated and described as embodied in an improved prime mover, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A rotating display, comprising:
   a) a fixed frame; and
   b) a rotating frame rotatably mounted to said fixed frame, wherein said fixed frame comprises a stand that comprises a base plate that is horizontally-oriented for resting on a horizontal surface, wherein said stand further comprises an upright member that extends vertically upwardly from said base plate, to an upper terminal end, wherein said stand further comprises a bearing that extends upwardly, in a vertical plane, from said upper terminal end of said upright member of said fixed frame, wherein said rotating frame comprises four bars that are slender, elongated, and rotate in a vertical plane, wherein each bar has:
      i) a pair of ends; and
      ii) a midpoint that is midway between said pair of ends thereof, wherein said four bars are joined to each other, at their midpoints, and extend radially outwardly therefrom, and are separated from each other by equal angles to form a wheel, wherein said rotating frame further comprises a sleeved hub that extends horizontally through and is affixed to said midpoint of each bar for rotation therewith, wherein said rotating frame further comprises four fixed arms that are slender, elongate, and rotate in a vertical plane, wherein said four fixed arms are spaced forwardly from, and overlie, but are shorter than, an associated bar.

2. A rotating display, comprising:
   a) a fixed frame; and
   b) a rotating frame rotatably mounted to said fixed frame, wherein said fixed frame comprises a stand that comprises a base plate that is horizontally-oriented for resting on a horizontal surface, wherein said stand further comprises an upright member that extends vertically upwardly from said base plate, to an upper terminal end, wherein said stand further comprises a bearing that extends upwardly, in a vertical plane, from said upper terminal end of said upright member of said fixed frame, wherein said rotating frame comprises four bars that are slender, elongated, and rotate in a vertical plane, wherein each bar has:
      i) a pair of ends; and
      ii) a midpoint that is midway between said pair of ends thereof, wherein said four bars are joined to each other, at their midpoints, and extend radially outwardly therefrom, and are separated from each other by equal angles to form a wheel, wherein said rotating frame further comprises a sleeved hub that extends horizontally through and is affixed to said midpoint of each bar for rotation therewith, wherein said rotating frame further comprises a shaft that extends horizontally from and is affixed to said sleeved hub for rotation therewith, and passes rotatably through said bearing of said stand for rotation relative thereto, to a terminal end.

3. The display as defined in claim 2, wherein said rotating frame further comprises a flywheel that is vertically-oriented and affixed to said terminal end of said shaft for rotation therewith.

4. The display as defined in claim 3, wherein said rotating frame further comprises a gear is vertically-oriented, and smaller than and engages with said flywheel for rotation therewith.

5. The display as defined in claim 4, wherein said rotating frame further comprises a generator that has an armature that is operatively connected to said gear for rotation therewith.

6. The display as defined in claim 5, wherein said rotating frame further comprises a rechargeable battery that is in electrical communication with said generator, and is charged by said generator when said wheel rotates, which causes said shaft to rotate, which causes said flywheel to rotate, which causes said gear to rotate, which causes said armature of said generator to rotate, which causes said generator to generate electricity, which charges said rechargeable battery.

* * * * *